United States Patent
Ozawa et al.

(10) Patent No.: US 8,038,491 B2
(45) Date of Patent: Oct. 18, 2011

(54) BOAT

(75) Inventors: Shigeyuki Ozawa, Shizuoka (JP);
Shigeharu Mineo, Shizuoka (JP);
Hitoshi Muramatsu, Shizuoka (JP);
Yasukazu Toyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 143 days.

(21) Appl. No.: 12/424,722

(22) Filed: Apr. 16, 2009

(65) Prior Publication Data

US 2009/0269995 A1 Oct. 29, 2009

(30) Foreign Application Priority Data

Apr. 25, 2008 (JP) ................... 2008-115081

(51) Int. Cl.
*B63H 23/34* (2006.01)

(52) U.S. Cl. ............... 440/83; 403/259; 440/75

(58) Field of Classification Search ............. 440/38, 440/75, 83; 403/2, 3, 315, 335, 337, 259, 403/261, 356
See application file for complete search history.

(56) References Cited

U.S. PATENT DOCUMENTS

| | | | | |
|---|---|---|---|---|
| 4,121,532 A * | 10/1978 | Coryell, III | ...................... | 440/83 |
| 4,767,230 A * | 8/1988 | Leas, Jr. | ...................... | 403/337 |
| 4,938,723 A * | 7/1990 | Yoshimura et al. | ............... | 440/83 |
| 5,306,093 A * | 4/1994 | Elbert | ...................... | 403/259 |
| 5,558,456 A * | 9/1996 | Nakase et al. | ................... | 440/83 |
| 6,231,450 B1 * | 5/2001 | Korus | ................... | 464/74 |
| 6,659,819 B2 * | 12/2003 | Fuse | ................... | 440/83 |
| 6,699,084 B2 * | 3/2004 | Fuse et al. | ................... | 440/83 |
| 6,716,076 B2 * | 4/2004 | Gokan et al. | ................... | 440/83 |
| 6,729,920 B2 * | 5/2004 | Fuse et al. | ................... | 440/83 |
| 2003/0015128 A1 | 1/2003 | Gokan et al. | | |
| 2006/0205293 A1 * | 9/2006 | Fuse | ................... | 440/83 |

FOREIGN PATENT DOCUMENTS

JP 2003-026093 A 1/2003

* cited by examiner

*Primary Examiner* — Lars A Olson
(74) *Attorney, Agent, or Firm* — Keating & Bennett, LLP

(57) ABSTRACT

A boat includes a connection structure that connects couplings via a transfer shaft on a rear end portion of a crankshaft extending rearward from an engine. The crankshaft and the transfer shaft are connected by screwing an external thread and a front internal thread, and the transfer shaft and the couplings are connected by screwing an external thread and an internal thread. There are provided an inner bolt that strengthens the connection between the external thread and the front internal thread, an end bolt that strengthens the connection between the transfer shaft and the couplings, and an outer nut that strengthens the connection between the crankshaft and the transfer shaft. The boat can prevent movement between the crankshaft and an intermediate member and between the intermediate member and a coupling both in a rotational direction and in an axial direction without causing an increase of processing time or processing cost.

6 Claims, 6 Drawing Sheets

BOAT

BACKGROUND OF THE INVENTION

1. Field of the Invention

The present invention relates to a boat provided with a connection structure arranged to connect a coupling via an intermediate member to a rear end portion of an output shaft extending rearward from an engine disposed in a hull for outputting a motive power of the engine.

2. Description of the Related Art

Conventionally, for example, there is a boat that ejects water suctioned from a bottom of the boat in the rear direction of a stern by operation of a jet pump so as to travel on water. An engine is disposed in a central portion of a hull of such a boat. A crankshaft (output shaft) extends toward the rear direction from the engine such that a rear end portion of the crankshaft is connected to a pump drive shaft of the jet pump via a coupling. An impeller is connected to the pump drive shaft. Accordingly, a rotational force of the crankshaft by operation of the engine is transmitted to the impeller, and thus the impeller rotates. Consequently, a propulsive force is generated by the boat.

However, an intake port of the jet pump of the boat may be exposed to air and suction air during traveling. Therefore, a load applied to the impeller is temporarily reduced. As a result, the load applied on an impeller shaft and a crankshaft easily varies. Therefore, when the crankshaft and the coupling are directly connected, a length of the crankshaft becomes long. Then, flexure is easily generated in the crankshaft by the load variation described above. As a result, the durability of the crankshaft is decreased. Accordingly, a boat is provided with a connection structure that connects a rear end portion of the crankshaft and the coupling via an intermediate member (see JP-A-2003-26093, for example).

In this boat, the connection structure is provided with a crankshaft (output shaft), an output shaft (a separate shaft from the output shaft), a connecting pipe (an intermediate member), and a coupling. A spline is provided on a rear end of an outer circumferential surface of the crankshaft and a front end of an outer circumferential surface of the output shaft. Further, a spline is provided on an inner circumferential surface of the connecting pipe and is engaged with the spline of the crankshaft and the spline of the output shaft, respectively. As these splines are engaged, the crankshaft and the output shaft are connected via the connecting pipe. In addition, splines are also provided on a rear end of the outer circumferential surface of the output shaft and on the inner circumferential surface of the coupling and can be engaged with each other. As these splines are engaged, the output shaft and the coupling are connected.

However, although each movement in the rotational direction of the output shaft in relation to the crankshaft and of the coupling in relation to the output shaft can be restricted by engagement between the splines in the conventional boat described above, movement in the axial direction cannot be restricted. Accordingly, a bolt is inserted in the output shaft from the rear end of the output shaft, and a screw on an end thereof is screwed together with a screw provided on an inner surface of the crankshaft to prevent the output shaft from moving in the axial direction in relation to the crankshaft. However, even this construction cannot prevent the coupling from moving in the axial direction in relation to the output shaft which generates a positional displacement. In addition, as the coupling moves in relation to the output shaft, a loss is generated in the drive force transmitted from the crankshaft to the coupling. Moreover, because spline processing is time-consuming, the processing time and processing cost are increased.

SUMMARY OF THE INVENTION

In order to overcome the problems described above, preferred embodiments of the present invention provide a boat that can prevent movement between the crankshaft and the intermediate member and between the intermediate member and the coupling both in the rotational direction and in the axial direction without causing an increase in the processing time or processing cost. According to a preferred embodiment of the present invention, a boat includes a connection structure arranged to connect a rear end portion of an output shaft extending from an engine disposed in a hull toward a rear portion of the hull to output a motive power of the engine and a coupling provided with a connecting portion via an intermediate member, wherein the output shaft and the intermediate member are connected to each other, and the intermediate member and the coupling are connected to each other, and a reinforcing member arranged to securely maintain at least one of the connection between the output shaft and the intermediate member and the connection between the intermediate member and the coupling is connected directly to any of the output shaft, the intermediate member, and the coupling, or connected via a member attached thereto.

The output shaft and the intermediate member and the intermediate member and the coupling are connected, preferably by screw connections, for example, according to a preferred embodiment of the present invention. Therefore, it is possible to restrict movement of the members connected to each other in the rotational direction and in the axial direction at the same time. This prevents a loss of the drive force from being generated when each member moves. In addition, the output shaft and the intermediate member, and the intermediate member and the coupling are connected preferably by screw connections, for example. Therefore, the connecting operation is easy. Moreover, each member is connected preferably by screw connections, for example. Therefore, a length in the axial direction can be shortened, and it becomes possible to save space in an engine room and to reduce the weight of the hull. In addition, since the screw connections are preferably used in place of splines, processing becomes easy, and a cost reduction can be achieved.

The reinforcing member arranged to securely maintain at least one connection between the output shaft and the intermediate member and the connection between the intermediate member and the coupling is preferably provided by screw connections between any of the output shaft, the intermediate member, and the coupling. Therefore, it is possible to provide a connection structure that is more firmly connected. The reinforcing member is preferably screwed to one of interconnected members and, at the same time, includes a member that can engage with a counterpart thereof or can apply pressure. The reinforcing member may be directly assembled with the output shaft, the intermediate member, or the coupling preferably by screw connections or may be assembled with the output shaft, the intermediate member, or the coupling via a member attached to the output shaft, the intermediate member, or the coupling.

The boat according to a preferred embodiment of the present invention has additional structural characteristics in that an external thread is preferably provided on a rear end of an outer circumferential surface of the output shaft, a front internal thread arranged to be screwed to the external thread of the output shaft is provided on a front portion of an inner circumferential surface of the intermediate member, the external thread and the front internal thread are screwed together to fix the rear end portion of the output shaft in the intermediate member, the reinforcing member includes an inner bolt provided with an external thread arranged to be screwed on a rear portion of the front internal thread of the intermediate member, and the inner bolt is screwed on the rear portion of the front internal thread of the intermediate member to apply tension to a rear end surface of the output shaft and thereby to strengthen the connection between the output shaft and the intermediate member.

As a result, it is possible to further strengthen the connections between the external thread of the output shaft and the front internal thread of the intermediate member to fix the output shaft and the intermediate member. Normally, when an external thread and an internal thread are screwed together, a fastening force in a base end portion of the external thread and an open side portion of the internal thread becomes strong. However, the fastening force in an end portion of the external thread and in an internal end portion of the internal thread gradually becomes small. Therefore, the fastening force at the time when the external thread of the output shaft and the front internal thread of the intermediate member are screwed together becomes small in the end portion (rear end portion) of the external thread and in the rear portion of the front internal thread. However, as the inner bolt screwed on the rear portion of the front internal thread of the intermediate member applies tension to the rear end surface of the output shaft in the front direction, it is possible to strengthen the screw connection between the end portion of the external thread of the output shaft and the rear portion of the front internal thread of the intermediate member. As a result, the fastening force at the time when the external thread of the output shaft and the front internal thread of the intermediate member are screwed together becomes strong in two positions at the front end and the rear end of the screwed portion, and thus the connection between the output shaft and the intermediate member becomes stronger.

Further, the boat according to a preferred embodiment of the present invention has further structural characteristics in that an external thread is preferably provided on a rear portion of the outer circumferential surface of the intermediate member, a rear internal thread is provided on a rear portion of the inner circumferential surface of the intermediate member, an internal thread arranged to be screwed to the external thread of the intermediate member is provided on an inner circumferential surface of a connecting portion of the coupling, the external thread of the intermediate member and the internal thread of the coupling are screwed together to fix the connecting portion of the coupling in a rear portion of the intermediate member, the reinforcing member includes an end bolt having a projecting portion arranged to engage with a rear surface of the coupling and has an external thread provided on an outer circumferential surface thereof and arranged to be screwed to the rear internal thread of the intermediate member, and the external thread of the end bolt is screwed to the rear internal thread of the intermediate member and the projecting portion is engaged with a rear surface of the coupling to further strengthen the screw connection between the intermediate member and the connecting portion of the coupling.

As a result, the end bolt can effectively prevent the screw connection between the external thread of the intermediate member and the internal thread of the coupling from loosening. Further, the end bolt is disposed in the internal portion of the intermediate member and the coupling. Therefore, a saving in space of the connection structure is not lost.

Further, the boat according to a preferred embodiment of the present invention has further structural characteristics in that a rotational direction at the time when the external thread of the intermediate member and the internal thread of the coupling are screwed together is a direction opposite to a rotational direction at the time when the rear internal thread of the intermediate member and the external thread of the end bolt are screwed together.

As a result, when the intermediate member rotates in a direction in which a screw connection between the external thread of the intermediate member and the internal thread of the coupling loosens, the rotation of the intermediate member is in the direction in which the screw connection between the rear internal thread of the intermediate member and the external thread of the end bolt tightens. Further, when the intermediate member rotates in a direction in which the screw connection between the rear internal thread of the intermediate member and the external thread of the end bolt loosens, the rotation of the intermediate member is in a direction in which the screw connection between the external thread of the intermediate member and the internal thread of the coupling tightens. Therefore, the intermediate member and the coupling are more securely fixed to each other.

Further, the boat according to a preferred embodiment of the present invention has further structural characteristics in that an engaged portion arranged to project to an outer circumferential side on a front end of the outer circumferential surface of the intermediate member is provided, an auxiliary external thread is provided on an outer circumferential surface of a member mounted on a portion in front of the external thread on the outer circumferential surface of the output shaft or on a portion in front of the external thread on the outer circumferential surface of the output shaft, the reinforcing member includes an outer nut having an engaging portion arranged to engage with the engaged portion of the intermediate member and has an internal thread provided on an internal circumferential surface thereof able to be screwed to the auxiliary external thread, and the engaging portion is engaged together with the engaged portion to screw the internal thread of the outer nut on the auxiliary external thread to strengthen the screw connection between the output shaft and the intermediate member.

As a result, the outer nut can effectively prevent the screw connection between the external thread of the output shaft and the front internal thread of the intermediate member from loosening.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
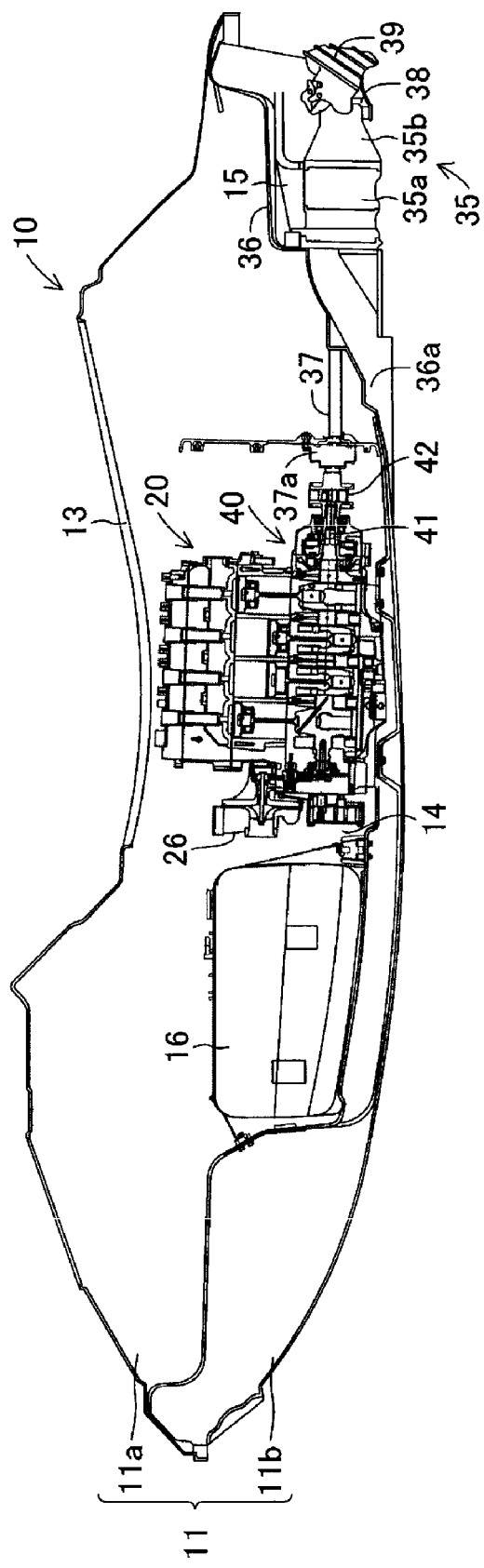
FIG. 1 is a cross-sectional view showing an internal portion of a boat according to a preferred embodiment of the present invention.
Figure 2:
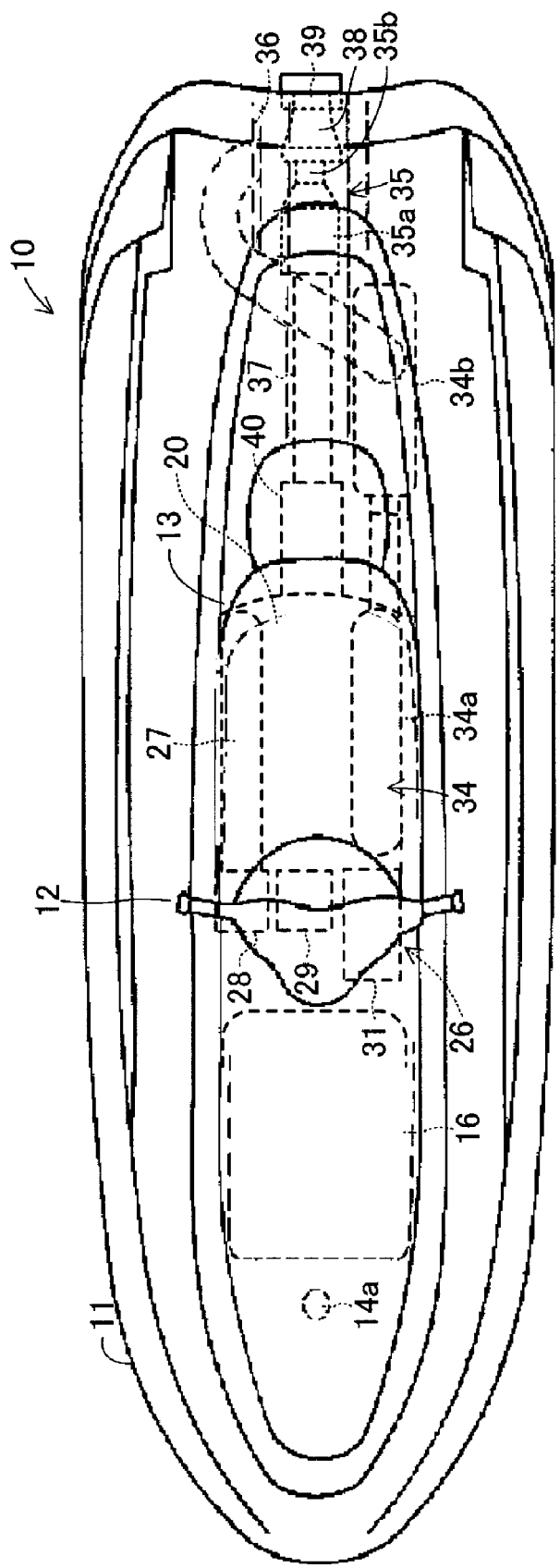
FIG. 2 is a plan view of the boat shown in FIG. 1.

Preferred embodiments of the present invention will be described hereinafter with reference to the accompanying drawings. FIG. 1 and FIG. 2 show a boat 10 according to a preferred embodiment of the present invention. In this boat 10, a deck 11a and a hull 11b are assembled to define a hull 11. A steering handle 12 is provided in an area slightly in front of the center of a top portion of the hull 11. A seat 13 is provided at a center of the top portion of the hull 11. The internal portion of the hull 11 includes an engine room 14 extending from a front portion to the center portion in the hull 11 and a pump room 15 in a rear portion of the hull 11. The engine room 14 is preferably provided with a fuel tank 16, an engine 20, an intake system 26, an exhaust system 34, and the like. The pump room 15 is provided with a propulsion apparatus 35 including a jet pump 35a and the like.

A connection structure 40 according to a preferred embodiment the present invention is provided between the engine 20 and the propulsion apparatus 35 in the engine room 14. An air duct 14a arranged to lead outside air into the engine room 14 is provided at a front portion and a rear portion in the engine room 14, respectively (the air duct at the rear portion is not shown). The air duct 14a extends vertically from the top portion of the hull 11 to the bottom of the engine room 14 and is arranged to take in the air outside the boat from a top end portion via a water proof structure (not shown) provided in the deck 11a and lead the air to a bottom end portion and into the engine room 14. The fuel tank 16 located at the front portion of the engine room 14 contains fuel. The engine 20 is provided in the engine room 14 at a center of the bottom portion of the hull 11.

Figure 3:
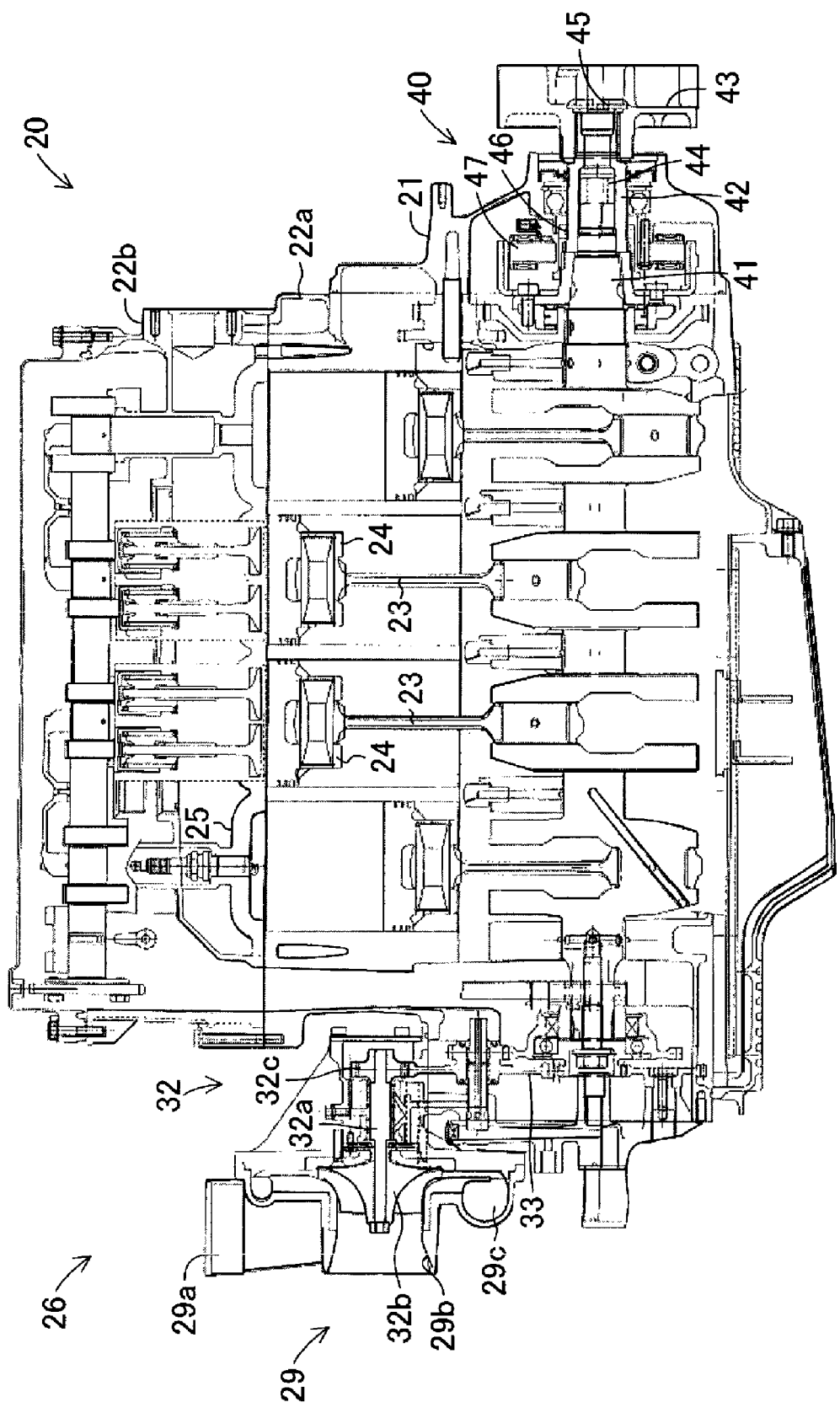
FIG. 3 is a cross-sectional view showing an engine.

As shown in FIG. 3, the engine 20 has an exterior casing defined by a cylinder body 22a and a cylinder head 22b in a top portion of a crankcase 21 housing a crankshaft 41 as an output shaft. The cylinder body 22a and the cylinder head 22b house the cylinders of the engine 20. The central axis of the cylinders extends generally vertically and perpendicular to the crankshaft 41 that extends generally horizontally. Pistons 24, which are connected to the crankshaft 41 via connecting rods 23, are vertically and movably housed in the inside of the cylinder body 22a and the cylinder head 22b. Vertical movement of the pistons 24 is transmitted to the crankshaft 41, causing rotational movement of the crankshaft 41.

Each cylinder 25 in the cylinder head 22b is provided with an intake valve and an exhaust valve (not shown). An inlet port connected to the intake valve of each cylinder 25 is connected to the intake system 26 that includes an inlet manifold or the like. An exhaust port in communication with the exhaust valve is connected to the exhaust system 34 that includes an exhaust manifold or the like. At the time of intake, the intake valve opens to send an air-fuel mixture made from the air supplied from the intake system 26 via the inlet port and the fuel supplied from a fuel supply system (not shown) into the cylinder head 22b, and closes at the time of exhaust. At the time of exhaust, the exhaust valve opens to send out combustion gas exhausted from the cylinder head 22b via the exhaust port to the exhaust system 34, and closes at the time of intake.

The intake system 26 is provided with an inlet manifold connected to the inlet port of each cylinder 25, an intake manifold 27 connected to an upstream end of each inlet manifold, a throttle body (not shown) connected to an upstream end of the intake manifold 27, and an intercooler 28 connected to a throttle body via an air duct. An air passage 29a having a pipe body shown in FIG. 3 is connected to the intercooler 28. The air passage 29a is connected to a supercharger 29, and the supercharger 29 is connected to an intake box 31 via an air passage (not shown). The intake box 31 takes air into the engine room 14 of the boat via the air duct 14a, makes the air pass through an air filter to remove foreign matter, and sends the air to the supercharger 29 via the air passage 29a.

The supercharger 29 is disposed generally at the center of the front end portion of the engine 20. The supercharger 29 is provided with an inlet port 29b connected to the air passage 29a to take in the air sent from the intake box and a discharge port 29c connected to the air passage 29a to send the air taken in from the inlet port 29b to the side of the intercooler 28. The discharge port 29c extends in the upper direction, and the top end portion thereof is connected to the air passage 29a. A rotating portion 32 provided with a rotational shaft 32a and a vane portion 32b connected to the front end portion of the rotational shaft 32a rotatable with the rotational shaft 32a is mounted in the supercharger 29. The rotating portion 32 is mounted while the vane portion 32b is located in the inlet port 29b.

A gear 32c is mounted on a rear end portion of the rotational shaft 32a. A gear 33 that meshes together with the gear 32c to transmit a rotational force of the crankshaft 41 to the rotating portion 32 is mounted in a front end portion of the crankshaft 41. Therefore, when the crankshaft 41 rotates as a result of operation of the engine 20, the rotational force is transmitted to the rotating portion 32 via the gear 33 and the gear 32c, and the vane portion 32b rotates. As a result of rotation of the vane portion 32b, the air sent to the inlet port 29b is compressed and discharged from the discharge port 29c to the air passage 29a. When the air is compressed by the supercharger 29, the temperature thereof rises, and the density is thereby decreased.

The intercooler 28 enables the compressed air sent from the supercharger 29 via the air passage 29a to pass therein and cool the compressed air while the compressed air is passing therein. The compressed air is sent to the throttle body via the air duct. The throttle body is provided with a horizontal rotational shaft and a throttle valve in the shape of a disk attached on the horizontal rotational shaft that is rotatable with the horizontal rotational shaft. As a result of the rotation of the horizontal rotational shaft, the throttle valve opens and closes the air passage in the throttle body. Consequently, flow rate of the air supplied to each cylinder 25 is adjusted. This adjustment is performed by operation of a throttle (not shown) provided on a grip of the steering handle 12. The intake manifold 27 prevents the compressed air sent from the intercooler 28 from generating an intake pulsation and sends the compressed air in a uniform state to the inlet manifold.

Fuel is supplied to the engine 20 by the fuel tank 16 via the fuel supply system. The fuel supply system includes a fuel pump, a fuel injector (not shown), and the like. The fuel taken out from the fuel tank 16 by operation of the fuel pump is sprayed in an atomized state into the cylinder 25 by the fuel injector. At this time, the fuel is mixed with the compressed air supplied from the intake box via the supercharger 29 and the like in the inlet manifold to form an air-fuel mixture which is sent into the cylinder 25. The engine 20 is provided with a spark plug. The air-fuel mixture explodes as a result of ignition of the spark plug. The piston 24 vertically moves as a result of this explosion, and the crankshaft 41 rotates as a result of the movement.

Figure 4:
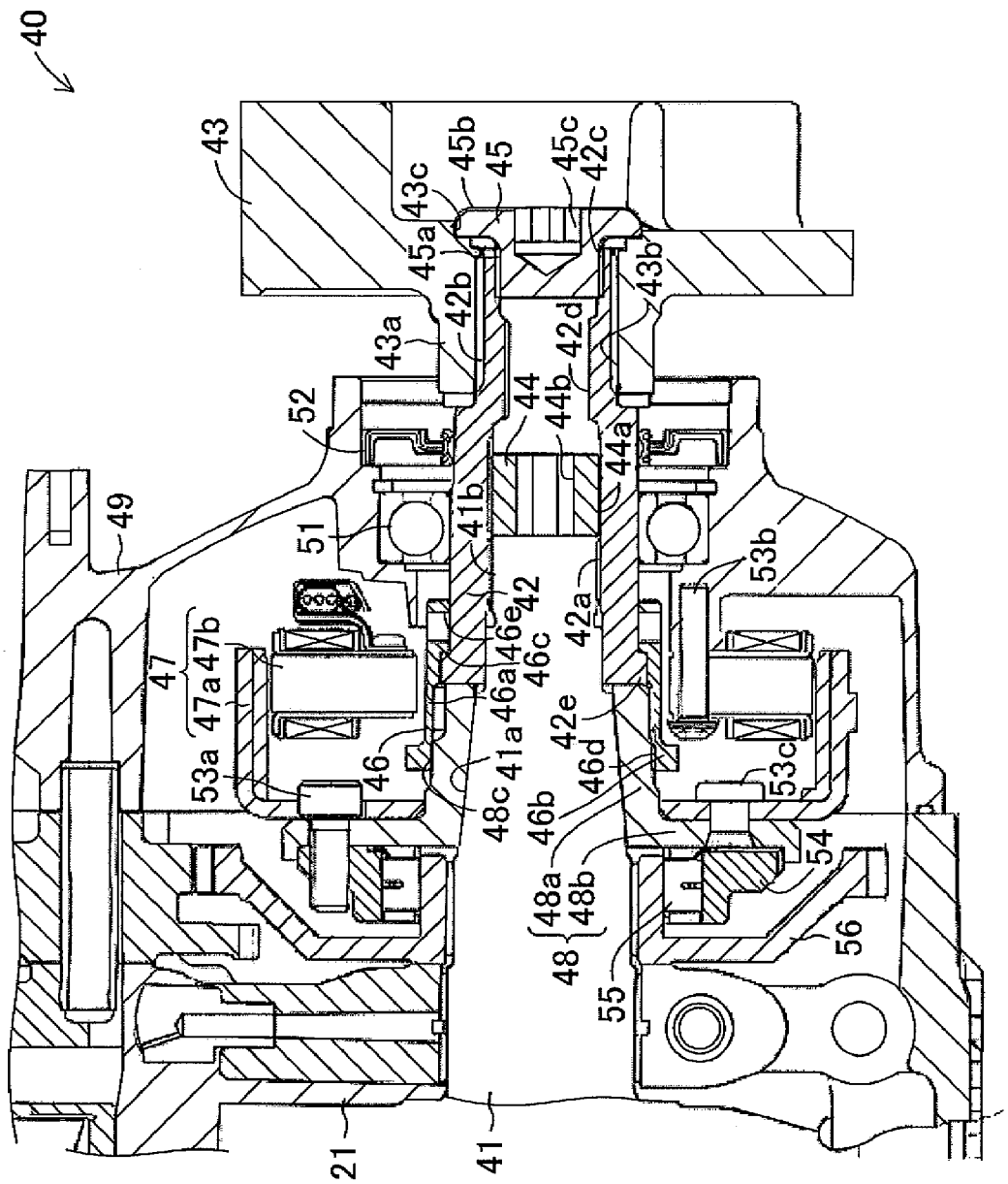
FIG. 4 is a cross-sectional view showing a connection structure.

The exhaust system 34 includes an exhaust manifold connected to the exhaust port of each cylinder 25, an exhaust pipe 34a connected to a downstream end of each exhaust manifold, a water lock 34b connected with the downstream end of the exhaust pipe 34a, and the like. A downstream end portion of the exhaust system 34 opens into a casing 36 for isolating the propulsion apparatus 35 from a main body of the hull 11 and communicates with the outside from a rear end portion of the hull 11. A pump drive shaft 37 is connected to the crankshaft 41 of the engine 20 via the connection structure 40, and a rear portion of the pump drive shaft 37 extends into the pump room 15. As shown in FIG. 4, the connection structure 40 includes the crankshaft 41, a transfer shaft 42 as an intermediate member according to a preferred embodiment of the present invention, couplings 43, an inner bolt 44 as a reinforcing member according to a preferred embodiment of the present invention, an end bolt 45, and an outer nut 46.

A rear end portion (a right side portion in FIG. 4) of the crankshaft 41 has a cylindrical shape with a plurality of steps that becomes thinner as it nears the rear end. A taper portion 41a whose rear portion becomes gradually thinner than the front portion thereof is provided at the center of the step portion in the axial direction, and an external thread 41b is provided on an outer circumference of the rear end portion arranged at a distance from the taper portion 41a. The transfer shaft 42 has an unevenly stepped cylindrical shape in which a portion from the front end to slightly more rearward than the center is arranged to have a larger diameter than the rear portion. A front end portion of the transfer shaft 42 on the inner circumferential surface from the front end to slightly more rearward than the center has a taper shape whose diameter on an opening end is slightly larger. In a portion from the rear portion of the above-mentioned portion to the stepped portion, a front internal thread 42a that can be screwed together with the external thread 41b of the crankshaft 41 is provided.

The length of the front internal thread 42a (length along the axial direction of the transfer shaft 42) is preferably approximately twice as long as the length of the external thread 41b (the length along the axial direction of the crankshaft 41) or longer. The external thread 41b is screwed together with a front portion of the front internal thread 42a. Further, an external thread 42b is provided on an outer circumferential surface of a rear portion of the transfer shaft 42, and a rear internal thread 42c is provided on a rear portion on an inner circumferential surface of a rear portion of the transfer shaft 42. A spline 42d is provided in a portion between the front internal thread 42a and the rear internal thread 42c, which is a front portion on the inner circumferential surface of the rear portion of the transfer shaft 42. This spline 42d is used to mesh with a certain tool provided with teeth so that rotation of the transfer shaft 42 can be prevented when the connecting portion 40 is assembled. An engaged portion 42e in the shape of a flange is provided in a front end portion on the outer circumferential surface of the transfer shaft 42.

The couplings 43 include a first coupling connected to the crankshaft 41 via the transfer shaft 42 and a second coupling connected to the pump drive shaft 37. When the pair of couplings 43 are assembled, a disk shaped space is formed. Further, a cylindrical connecting portion 43a as a connecting portion according to a preferred embodiment of the present invention projects in the front direction at the main body center of the couplings 43 connected to the crankshaft 41, and on the inner circumferential surface of which an internal thread 43b that can be screwed together with the external thread 42b of the transfer shaft 42. An engaged recess 43c is provided along the circumference on a rear end inner circumference side of the cylindrical connecting portion 43a.

Figure 5:
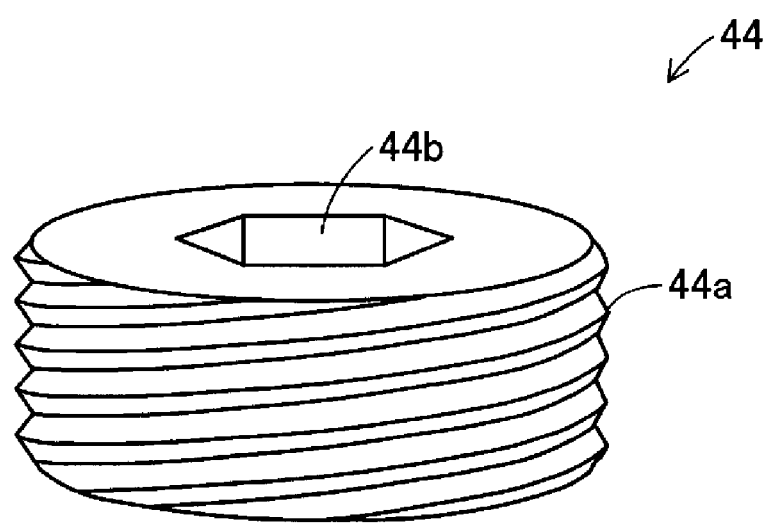
FIG. 5 is a perspective view showing an inner bolt.

As shown in FIG. 5, the inner bolt 44 has a generally cylindrical shape, an external thread 44a on the outer circumference thereof, and a hole 44b in a hexagonal shape that passes through the center portion thereof in the axial direction. The external thread 44a can be screwed together with the front internal thread 42a of the transfer shaft 42. The external thread 44a is screwed together with the rear portion of the front internal thread 42a to locate the inner bolt 44 in the transfer shaft 42. As a result, the inner bolt 44 can be moved between the rear end surface of the crankshaft 41 and the rear end portion of the front internal thread 42a. A projecting portion 45b in the shape of a flange projects from the rear end outer circumference in a cylindrical body (the rear end outer circumference shown in FIG. 4) having an external thread 45a on the outer circumferential surface thereof to define the end bolt 45. A hole 45c in a hexagonal shape extends in the front direction from the center of the rear end surface.

The external thread 45a can be screwed together with the rear internal thread 42c of the transfer shaft 42, and the projecting portion 45b can be engaged together with the engaged recess 43c of the couplings 43. Therefore, while the projecting portion 45b is engaged together with the engaged recess 43c, as the external thread 45a is screwed together with the rear internal thread 42c, the transfer shaft 42 and the couplings 43 can be fixed by the end bolt 45. In this case, the end bolt 45 strengthens the fixed state between the transfer shaft 42 and the couplings 43 that are assembled by screwing the external thread 42b and the internal thread 43b.

Further, the rotational direction at the time when the external thread 42b of the transfer shaft 42 and the internal thread 43b of the couplings 43 are screwed together is a direction opposite to the rotational direction at the time when the rear internal thread 42c of the transfer shaft 42 and the external thread 45a of the end bolt 45 are screwed together. Therefore, when the transfer shaft 42 or the couplings 43 rotate in the direction such that screwing between the external thread 42b and the internal thread 43b loosens, the fastening force of screwing between the rear internal thread 42c and the external thread 45a becomes greater. Further, when the transfer shaft 42 or the couplings 43 rotate in the direction such that screwing between the rear internal thread 42c and the external thread 45a loosens, the fastening force of screwing between the external thread 42b and the internal thread 43b becomes greater.

Figure 6:
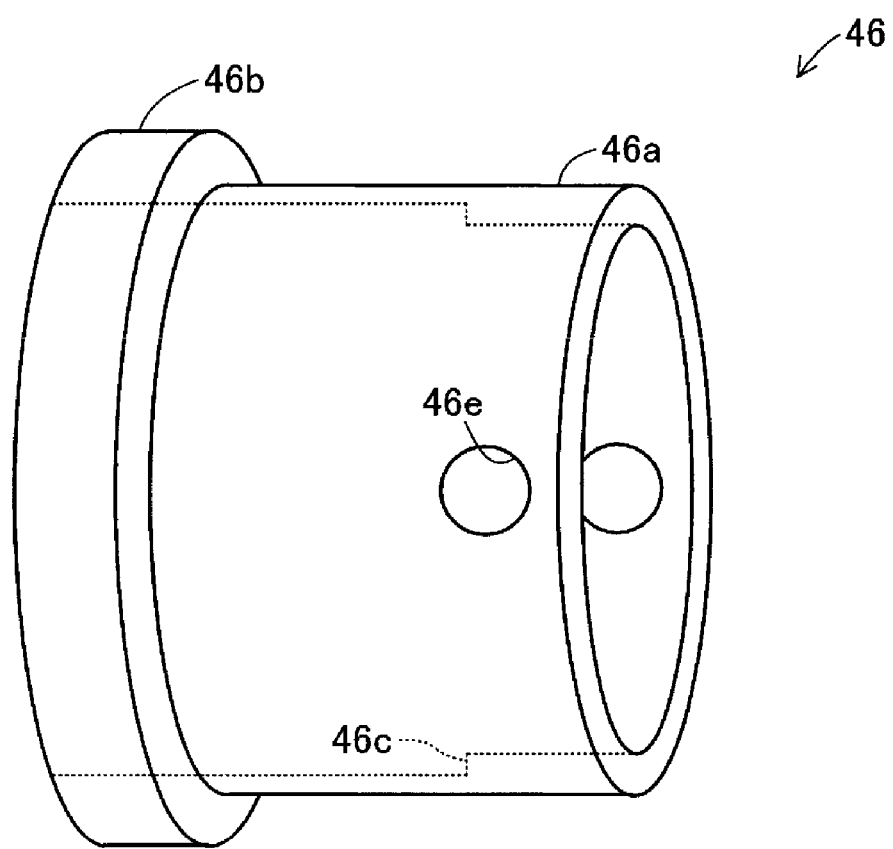
FIG. 6 is a perspective view showing an outer nut.

Further, a connecting member 48 for connecting a flywheel magneto 47a of a flywheel magneto assembly 47 to the crankshaft 41 is fixed on the outer circumferential surface of the taper portion 41a of the crankshaft 41. The connecting member 48 includes a cylindrical portion 48a having a taper shape, whose diameter on a rear portion is smaller than the diameter of a front portion, and which can be fitted with the outer circumferential surface of the taper portion 41a, and a flange portion 48b provided on a front end outer circumference of the cylindrical portion 48a. An external thread 48c as an auxiliary external thread according to a preferred embodiment of the present invention is provided on the outer circumferential surface of the cylindrical portion 48a. A front end surface of the transfer shaft 42 is pressed against a rear end surface of the connecting member 48. An outer circumferential surface of the transfer shaft 42 is fixed on the connecting member 48 via the outer nut 46. As shown in FIG. 6, the outer nut 46 includes a cylindrical portion 46a and a flange portion 46b provided on a front end outer circumference of the cylindrical portion 46a.

An engaging portion 46c, having a step portion such that an internal diameter on a front portion is larger than an internal diameter on a rear portion, is provided on a rear portion on the internal circumferential surface of the cylindrical portion 46a. An internal thread 46d is provided in a front end of the inner circumferential surface of the cylindrical portion 46a. The engaging portion 46c can be engaged with the engaged portion 42e of the transfer shaft 42. The internal thread 46d can be screwed together with the external thread 48c of the connecting member 48. Therefore, while the engaging portion 46c is engaged together with the engaged portion 42e, as the internal thread 46d is screwed together with the external thread 48c, the transfer shaft 42 can be fixed on the connecting member 48 by the outer nut 46.

In this case, the outer nut 46 prevents the transfer shaft 42 and the connecting member 48 fixed on the crankshaft 41 from moving in the direction where the transfer shaft 42 and the connecting member 48 move away from each other. Further, a pair of operation holes 46e are arranged to face each other on a rear end of the cylindrical portion 46a. When the outer nut 46 is rotated in relation to the connecting member 48, an operating tool can be inserted in the operation holes 46e. The surroundings of a rear end portion of the crankshaft 41 are covered with the crankcase 21 and a flywheel cover 49.

The flywheel cover 49 is provided with a coil 47b of the flywheel magneto assembly 47, a bearing 51, and an oil seal 52 in advance. A cylindrical body, whose length in the axial direction is short, extends rearward from an outer circumferential peripheral portion of a disk fixed on the flange portion 48b of the connecting member 48 by a bolt 53a, and a magnet is fixed on the inner circumferential surface of the cylindrical body to define the flywheel magneto 47a described above. Moreover, the coil 47b is provided in the shape of a ring that encloses an outer circumference of the outer nut 46. While the outer circumferential surface faces the magnet of the flywheel magneto 47a, the coil 47b is fixed on the flywheel cover 49 by a bolt 53b.

Further, a hole, through which the transfer shaft 42 passes, is provided at a rear end center of the flywheel cover 49, and two housing portions are provided around the hole longitudinally in line. The bearing 51 is provided in the housing portion on a front portion, and the transfer shaft 42 is supported by the bearing 51. The oil seal 52 is provided in the housing portion on a rear portion. The interface between outer circumferential surface of the transfer shaft 42 and the flywheel cover 49 is sealed by the oil seal 52.

A connecting portion 54 in the shape of a ring is connected to the flange portion 48b of the connecting member 48 by a bolt 53c. The connecting portion 54 is located in the crankcase 21 and connected to a gear 56 for a starter motor via a one-way clutch 55. At a time of starting, the gear 56 transmits the drive force of the starter motor to the connecting portion 54 via the one-way clutch 55 and thereby rotates and operates the crankshaft 41 and the like. After the engine 20 starts, when the crankshaft 41 and the like rotate as a result of the drive force of the engine 20, connection between the one-way clutch 55 and the connecting portion 54 is released.

Of the pair of couplings 43, the coupling 43 disposed on a rear portion is connected to the pump drive shaft 37. The pump drive shaft 37 passes through a bearing device 37a (see FIG. 1), in which a bearing and an oil seal are contained, and extends rearward. The pump drive shaft 37 is connected to an impeller (not shown) provided in the jet pump 35a provided on the stern of the hull 11 and transmits the rotational force of the crankshaft 41 by operation of the engine 20 to the impeller to rotate the impeller. The propulsion apparatus 35 provided with the jet pump 35a is provided with a water inlet port 36a open in the bottom of the hull 11 and a water ejection port 35b open in the stern. Water taken in from the water inlet port 36a is ejected from the water ejection port 35b by operation of the jet pump 35a to generate the propulsive force of the hull 11.

A steering nozzle 38, whose rear portion is horizontally moved according to the operation of the steering handle 12 to change the traveling direction of the boat 10, is mounted in a rear end portion of the jet pump 35a. A reverse gate 39, which vertically moves to change the traveling direction of the boat 10 to a fore-and-aft direction, is mounted on a rear portion of the steering nozzle 38. Besides the devices described above, the boat 10 is provided with various types of devices such as an electrical equipment box that houses an ECU (electric control unit) including a CPU, a ROM, a RAM, a timer, and the like and various types of electrical apparatus, a start switch, and various types of sensors, which are necessary for enabling the boat 10 to travel without any problems.

When the connection structure 40 is to be assembled in the boat 10 as described above, the connecting member 48, with which the flywheel magneto 47a and the connecting portion 54 are assembled, is fitted together with the taper portion 41a of the crankshaft 41. As a result, the connecting portion 54 is assembled on the one-way clutch 55. Following this, the external thread 44a of the inner bolt 44 is screwed together with the front internal thread 42a of the transfer shaft 42 to locate the inner bolt 44 on a far side of the transfer shaft 42 (a portion from the center to the rear portion). After this, the front internal thread 42a of the transfer shaft 42 is screwed together with the external thread 41b of the crankshaft 41 to fix the transfer shaft 42 on the crankshaft 41.

In this case, while the connecting member 48 and the flywheel magneto 47a are fixed, a tooth portion of a tool is meshed together with the spline 42d of the transfer shaft 42, and the tool is rotated. As a result, the external thread 41b and the front internal thread 42a are screwed together. At this time, in general, screwing between the external thread 41b and the front internal thread 42a are in a state that a fastening force becomes larger nearing a front portion of a thread portion, and that the fastening force becomes smaller nearing a rear portion. After this, a hex wrench is inserted from a rear end opening of the transfer shaft 42, and an end portion thereof is fitted in the hole 44b of the inner bolt 44. Then, the inner bolt 44 is moved forward by rotating the hex wrench and thereby pressed against a rear end surface of the crankshaft 41.

As a result, the external thread 41b and the front internal thread 42a are screwed together in a state that a fastening force is large not only on the front portion but also on the rear portion. Consequently, the transfer shaft 42 is fixed on the crankshaft 41 more firmly. After this, the outer nut 46 is disposed on a front portion of the outer circumference of the transfer shaft 42. Then, while the engaging portion 46c is engaged together with the engaged portion 42e, the internal thread 46d is screwed together with the external thread 48c. As a result, the transfer shaft 42 is fixed on the connecting member 48 by the outer nut 46. In this case, while the tool is meshed together with the spline 42d of the transfer shaft 42 to prevent rotation of the transfer shaft 42, a tool is inserted in the operation holes 46e of the outer nut 46, and the tool is rotated.

The flywheel cover 49 is attached to the crankcase 21. Portions other than the portion having the thin diameter on the rear portion of the transfer shaft 42 are covered with the crankcase 21 and the flywheel cover 49. After this, the couplings 43 are attached to the transfer shaft 42. In this case, while a tool is meshed together with the spline 42d of the transfer shaft 42 to prevent rotation of the transfer shaft 42, the coupling 43 is rotated, for example, in the clockwise direction in a rear view. Consequently, the internal thread 43b and the external thread 42b are screwed together. As the internal thread 43b and the external thread 42b are screwed together, the couplings 43 are fixed on the transfer shaft 42.

Following this, the end bolt 45 is attached to the rear end portion of the transfer shaft 42. In this case, while the couplings 43 are prevented from rotating, the end bolt 45 is rotated in relation to the transfer shaft 42 in the counterclockwise direction in a rear view. Consequently, the external thread 45a and the rear internal thread 42c are screwed together. In this case, the projecting portion 45b of the end bolt 45 is engaged together with the engaged recess 43c of the couplings 43. Therefore, the transfer shaft 42 and the couplings 43 are fixed via the end bolt 45 as a result of screwing of the external thread 45a and the rear internal thread 42c and meshing of the projecting portion 45b and the engaged recess 43c. As a result, assembly of the connection structure 40 ends.

The couplings 43 of the connection structure 40 are connected to the couplings 43 attached to the front end of the pump drive shaft 37. As a result, the crankshaft 41 is connected to the pump drive shaft 37 via the connection structure 40. When the boat 10 is operated, an operator sits on the seat 13, and turns the start switch on. As a result, the boat 10 becomes able to travel, the steering handle 12 is steered, and the throttle operator provided on the grip of the steering handle 12 is operated. As a result, the boat 10 travels in a certain direction and at a certain speed according to various operations.

As described above, in the boat 10 according to the present preferred embodiment, the crankshaft 41 and the transfer shaft 42, and the transfer shaft 42 and the couplings 43, are preferably connected by screws, for example. Therefore, it is possible to restrict movement of the members connected to each other in the rotational direction and in the axial direction at the same time. This prevents a loss of the drive force transmission from being generated when each member moves. Further, the crankshaft 41, the transfer shaft 42, the couplings 43, the inner bolt 44, the end bolt 45, and the outer nut 46 that define the connection structure 40 are preferably assembled by screws, for example. Therefore, the connecting operation is easy.

Moreover, the crankshaft 41, the transfer shaft 42, and the couplings 43, which are connected in the axial direction, are preferably connected by screws, for example. Therefore, a length in the axial direction can be shortened, and it becomes possible to save space in the engine room 14 and to reduce the weight of the hull 11. Further, the screws are preferably used to connect the various members. As a result, processing becomes easy, and a cost reduction can be achieved. Moreover, the rear end surface of the crankshaft 41 is pushed forward by the inner bolt 44 that is screwed on the rear portion of the front internal thread 42a of the transfer shaft 42. As a result, the external thread 41b of the crankshaft 41 and the front internal thread 42a of the transfer shaft 42 are screwed together more firmly.

The projecting portion 45b of the end bolt 45 is engaged together with the engaged recess 43c of the couplings 43, and the external thread 45a of the end bolt 45 is preferably screwed together with the rear internal thread 42c of the transfer shaft 42. As a result, the transfer shaft 42 and the couplings 43 can be fixed more firmly. Further, the end bolt 45 is disposed on the internal portion of the transfer shaft 42 and the couplings 43. Therefore, a saving in space of the connection structure 40 is not lost.

Moreover, the rotational direction at the time when the external thread 42b of the transfer shaft 42 and the internal thread 43b of the couplings 43 are screwed together is the direction opposite to the rotational direction at the time when the rear internal thread 42c of the transfer shaft 42 and the external thread 45a of the end bolt 45 are screwed together. Therefore, screwing in both directions are not loosened at the same time. Therefore, the transfer shaft 42 and the couplings 43 are fixed more securely. Further, the outer nut 46 is provided in the connection structure 40. Therefore, it can be effectively prevented that screwing between the external thread 41b of the crankshaft 41 and the front internal thread 42a of the transfer shaft 42 is loosened.

The boat is not limited to the various preferred embodiments described above and can be implemented with appropriate modifications. For example, in the above-mentioned preferred embodiments, the rotational direction at the time when the external thread 42b and the internal thread 43b are screwed together preferably is the direction opposite to the rotational direction at the time when the rear internal thread 42c and the external thread 45a are screwed together. However, these directions may be the same. Further, the rotational direction of other screwed portions provided to the connection structure 40 can be appropriately modified. Moreover, it is not necessary to use each of the inner bolt 44, the end bolt 45, and the outer nut 46, as only one may be used. Further, dispositions, structures, and the like of other portions that define the boat according to the various preferred embodiments of the present invention can be implemented with appropriate modification within the technical scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A boat comprising:
   an output shaft extending from an engine toward a rear portion of a hull and arranged to output power from the engine;
   an intermediate member including an internal thread connected to an external thread of the output shaft defining a screw connection between the intermediate member and the output shaft;
   a coupling including an internal thread connected to an external thread of the intermediate member defining a screw connection between the coupling and the intermediate member; and
   a reinforcing member arranged to reinforce at least one of the screw connection between the output shaft and the intermediate member and the screw connection between the intermediate member and the coupling; wherein
   the external thread of the output shaft is provided on a rear end portion of an outer circumferential surface of the output shaft;
   the internal thread on the intermediate member includes a front internal thread arranged to be screwed to the external thread of the output shaft, the front internal thread is provided on a front portion of an inner circumferential surface of the intermediate member;
   the external thread of the output shaft and the front internal thread are screwed together to fix the rear end portion of the output shaft in the intermediate member;
   the reinforcing member includes an inner bolt provided with an external thread arranged to be screwed to a rear portion of the front internal thread of the intermediate member; and
   the inner bolt is screwed to the rear portion of the front internal thread of the intermediate member to apply tension to a rear end surface of the output shaft and thereby strengthen the connection between the output shaft and the intermediate member.

2. The boat according to claim 1, wherein the intermediate member includes an engaged portion that projects from a front end of an outer circumferential surface;

an auxiliary external thread is disposed on an outer circumferential surface of a member mounted on a portion in front of the external thread on the outer circumferential surface of the output shaft;

the reinforcing member further includes an outer nut provided with an engaging portion arranged to engage with the engaged portion of the intermediate member and has an internal thread disposed on an internal circumferential surface thereof and arranged to be screwed together with the auxiliary external thread; and the engaging portion is engaged together with the engaged portion to screw the internal thread of the outer nut on the auxiliary external thread to strengthen the connection between the output shaft and the intermediate member.

3. A boat comprising:

an output shaft extending from an engine toward a rear portion of a hull and arranged to output power from the engine;

an intermediate member including an internal thread connected to an external thread of the output shaft defining a screw connection between the intermediate member and the output shaft;

a coupling including an internal thread connected to an external thread of the intermediate member defining a screw connection between the coupling and the intermediate member; and a reinforcing member arranged to reinforce at least one of the screw connection between the output shaft and the intermediate member and the screw connection between the intermediate member and the coupling; wherein the external thread of the intermediate member is provided on a rear portion of an outer circumferential surface of the intermediate member;

a rear internal thread is provided on a rear portion of an inner circumferential surface of the intermediate member;

the internal thread of the coupling is provided on an inner circumferential surface of a connecting portion of the coupling;

the external thread of the intermediate member and the internal thread of the coupling are screwed together to fix the connecting portion of the coupling to a rear portion of the intermediate member;

the reinforcing member includes an end bolt provided with a projecting portion arranged to engage with a rear surface of the coupling and has an external thread provided on an outer circumferential surface thereof and arranged to be screwed to the rear internal thread of the intermediate member; and the external thread of the end bolt is screwed to the rear internal thread of the intermediate member and the projecting portion is engaged with the rear surface of the coupling to further strengthen the connection between the intermediate member and the connecting portion of the coupling.

4. The boat according to claim 3, wherein a first rotational direction when the external thread of the intermediate member and the internal thread of the coupling are screwed together is opposite to a second rotational direction when the rear internal thread of the intermediate member and the external thread of the end bolt are screwed together.

5. A boat comprising:

an output shaft extending from an engine toward a rear portion of a hull and arranged to output power from the engine;

an intermediate member including an internal thread screwed to an external thread of the output shaft; and a reinforcing member including an external thread screwed to the internal thread of the intermediate member; wherein the reinforcing member is arranged to abut a rear surface of the output shaft to apply tension between the output shaft and the intermediate member.

6. A boat comprising:

an output shaft extending from an engine toward a rear portion of a hull and arranged to output power from the engine;

an intermediate member connected to the output shaft;

a coupling including an internal thread connected to an external thread of the intermediate member; and a reinforcing member including an external thread screwed to an internal thread of the intermediate member; wherein the internal thread of the coupling and the external thread of the intermediate member are screwed together in a rotational direction opposite to a rotational direction in which the external thread of the reinforcing member and the internal thread of the intermediate member are screwed together.

* * * * *